(12) United States Patent
Lessin et al.

(10) Patent No.: US 8,938,411 B2
(45) Date of Patent: Jan. 20, 2015

(54) INFERRING USER FAMILY CONNECTIONS FROM SOCIAL INFORMATION

(75) Inventors: Samuel Lessin, Palo Alto, CA (US); Joshua Wiseman, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 257 days.

(21) Appl. No.: 13/569,989

(22) Filed: Aug. 8, 2012

(65) Prior Publication Data
US 2014/0046887 A1 Feb. 13, 2014

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 7,827,208 B2 | 11/2010 | Bosworth et al. | |
| 8,171,128 B2 | 5/2012 | Zuckerberg et al. | |
| 8,688,980 B2 * | 4/2014 | Davis et al. | 713/166 |
| 2008/0071775 A1 | 3/2008 | Gross | |
| 2010/0063993 A1 | 3/2010 | Higgins et al. | |
| 2010/0076850 A1 | 3/2010 | Parekh et al. | |
| 2010/0082360 A1 | 4/2010 | Chien et al. | |
| 2010/0106573 A1 * | 4/2010 | Gallagher et al. | 705/14.4 |
| 2010/0203876 A1 | 8/2010 | Krishnaswamy | |
| 2010/0274815 A1 * | 10/2010 | Vanasco | 707/798 |
| 2010/0331146 A1 | 12/2010 | Kil | |
| 2011/0022602 A1 | 1/2011 | Luo et al. | |
| 2012/0110071 A1 | 5/2012 | Zhou et al. | |
| 2012/0166532 A1 * | 6/2012 | Juan et al. | 709/204 |
| 2012/0278262 A1 | 11/2012 | Morgenstern et al. | |
| 2012/0278317 A1 | 11/2012 | Spiegel | |
| 2013/0080524 A1 | 3/2013 | Rubinstein et al. | |
| 2013/0132194 A1 | 5/2013 | Rajaram | |
| 2013/0159220 A1 | 6/2013 | Winn et al. | |
| 2013/0268973 A1 | 10/2013 | Archibong et al. | |
| 2013/0304685 A1 | 11/2013 | Kurata et al. | |
| 2013/0317874 A1 | 11/2013 | Kozloski et al. | |
| 2014/0012925 A1 | 1/2014 | Narayanan et al. | |

OTHER PUBLICATIONS

U.S. Appl. No. 13/167,701, filed Jun. 24, 2011 (copy not enclosed).
U.S. Appl. No. 13/429,126, filed Mar. 23, 2012 (copy not enclosed).
U.S. Appl. No. 13/584,625, filed Aug. 13, 2012 (copy not enclosed).
U.S. Appl. No. 13/627,774, filed Sep. 26, 2012 (copy not enclosed).
Mislove, A. et al., "You Are Who You Know: Inferring User Profiles in Online Social Networks," *Proceedings of the Conference on Web Search and Data Mining '10*, Feb. 4-6, 2010, pp. 251-260, New York, New York, USA.

\* cited by examiner

*Primary Examiner* — Kakali Chaki
*Assistant Examiner* — Luis Sitiriche
(74) *Attorney, Agent, or Firm* — Fenwick & West LLP (57) ABSTRACT

A social networking system infers family connections between a target user and one or more additional social networking system users based on information stored by the social networking system about the target user and the target user's connections. The inferred connections may be sent to the target user for verification and stored by the social networking system if confirmed by the target user. Stored connection information about a set of users connected to the target user may be used to infer connections between the target user and subject users connected to one or more of the users connected to the target user.

15 Claims, 5 Drawing Sheets

INFERRING USER FAMILY CONNECTIONS FROM SOCIAL INFORMATION

BACKGROUND

This invention relates to social networking, and in particular to inferring a social networking system user's family relationships from social information about the user and the user's connections stored in a social networking system.

Social networking systems allow users to create accounts that are tied to their identities. Users of a social networking system may create user profiles that store information that they choose to share with the system. A user's profile may include, for example, information about a user's age, gender, employer, alma mater, and marital status. Social networking systems further allow users to specify connections to other users of the system. When users form these connections to other users it is sometimes referred to as "friending" or "connecting." The users that are connected to a specific user are called the "connections" or "friends" of a user.

Additionally, the social networking system may store information indicating a relationship between users that are connected to each other in the social networking system. The relationship may indicate, for example, that a user is a "family connection," such as a spouse, sibling, parent, or child, of another user. However, the relationship information collected by the social networking system for connections may be incomplete. For example, users may fail to identify family members that are connected to them in the social network because it may not occur to them to provide such information, or providing such information may be an inconvenience.

While social networking systems can mandate that their users specify certain information related to their relationships, such a requirement may likely degrade a user's experience, as users may not be prepared to spend the time to provide data when requested.

SUMMARY

A social networking system allows its users to form connections with each other to encourage interaction between users. A social networking system user may add connections to a number of other users to whom they desire to be connected. These connections between users are maintained by the social networking system. A connection type may be associated with different connections, allowing a user to identify its relationship to other users. To aid a user in forming connections with other users, the social networking system may suggest to a target user additional users, such as users likely to have a familial relationship with the target user, with which the target user may form a connection.

The social networking system identifies connections between an inference target user and intermediate users then uses connections between the additional users and subject users to infer connections between the inference target user and one or more subject users. The type of connection between the inference target user and an intermediate user, as well as the type of connection between the intermediate user and a subject user, are used to infer a connection between the inference target user and the subject user. For example, a familial relationship between the inference target user and the intermediate user as well as a familial relationship between the intermediate user and a subject user may be used by the social networking system to infer a familial relationship between the inference target user and the subject user.

The inference target user may be notified of the inferred connection. If the inference target user confirms the inferred connection, the social networking system establishes and stores a connection between the inference target user and the subject user. This allows the social networking system to augment data provided by a user with additional data from the social networking system likely to be relevant to the user-provided data. Hence, the social networking system may increase the amount of information stored about the user and also increase interaction between the user and additional users by identifying additional connections for the user to form.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system offers its users the ability to communicate and interact with other users of the social networking system. Users join the social networking system and add connections to a number of other users to whom they desire to be connected. Users of the social networking system may provide personal information to the social networking system, which is stored in user profiles. For example, a user may provide age, gender, geographical location, education history, employment history and the like. The data provided by a user may be used by the social networking system, along with other data, to infer further information pertaining to the user. For example, the social networking system uses the provided data along with other information in the social networking system to generate suggested connections for the user, such as family connections.

System Architecture

Figure 1:
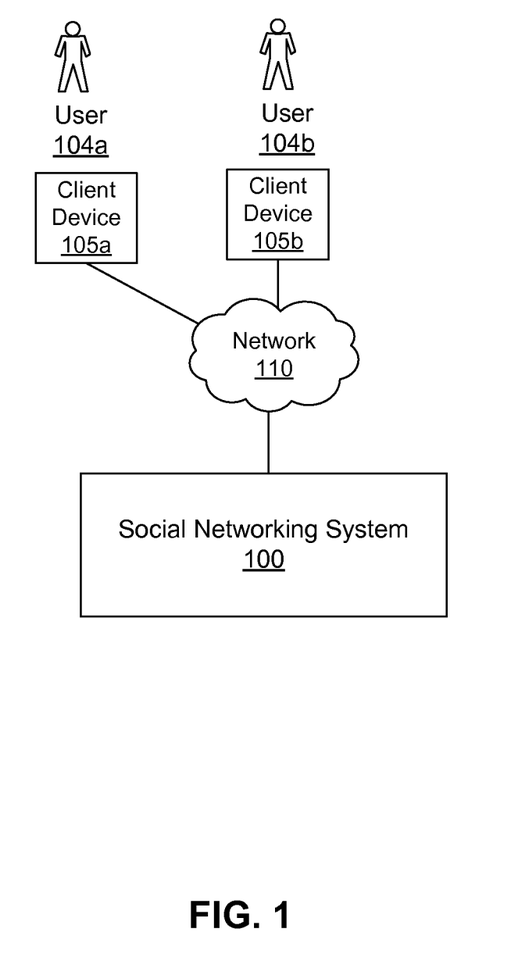
FIG. 1 is a high level block diagram of a system environment in which a social networking system operates in accordance with an embodiment of the invention.

FIG. 1 is a high level block diagram illustrating an embodiment of a system environment for inferring connection information for social networking system users 104 (also referred to as "users") based on social networking system data. The users 104a and 104b interact with the social networking system 100 using client devices 105a and 105b, which communicate with a social networking system 100 via a network 110.

The client devices 105 comprise one or more computing devices capable of receiving input from the users 104 and transmitting and/or receiving data via the network 110. In one embodiment, a client device 105 is a conventional computer system. In another embodiment, a client device 105 is a device having computer functionality, such as a personal digital assistant (PDA), mobile telephone, smart-phone, etc.

A client device 105 may execute an application, for example, a browser application that allows a user 104 of the client device 105 to view information from and provide information to the social networking system 100. In some implementations the client device 105 executes a mobile application (such as an IOS® app or an ANDROID™ app) that allows a user 104 to interact with the social networking system 100. In one implementation client devices 105 receive informative "suggestions" for the users 104 from the social networking system 100, which the users 104 can confirm or deny using a user interface on the client devices 105. For example, a user A may receive a suggestion from the social networking system 100 that a specific other user B is their brother; the user A can then use an interface on their client device 105 to confirm or deny that the user B is their brother, and this information (confirmation or denial) may be sent to the social networking system 100.

The network 110 enables communications between one or more client devices 105 and the social networking system 100. In one embodiment, the network 110 uses standard communications technologies and/or protocols. Thus, the network 110 may include communication channels using technologies such as Ethernet, 802.11, worldwide interoperability for microwave access (WiMAX), 3G, digital subscriber line (DSL), etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. Data exchanged over the network 110 may be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

Figure 2:
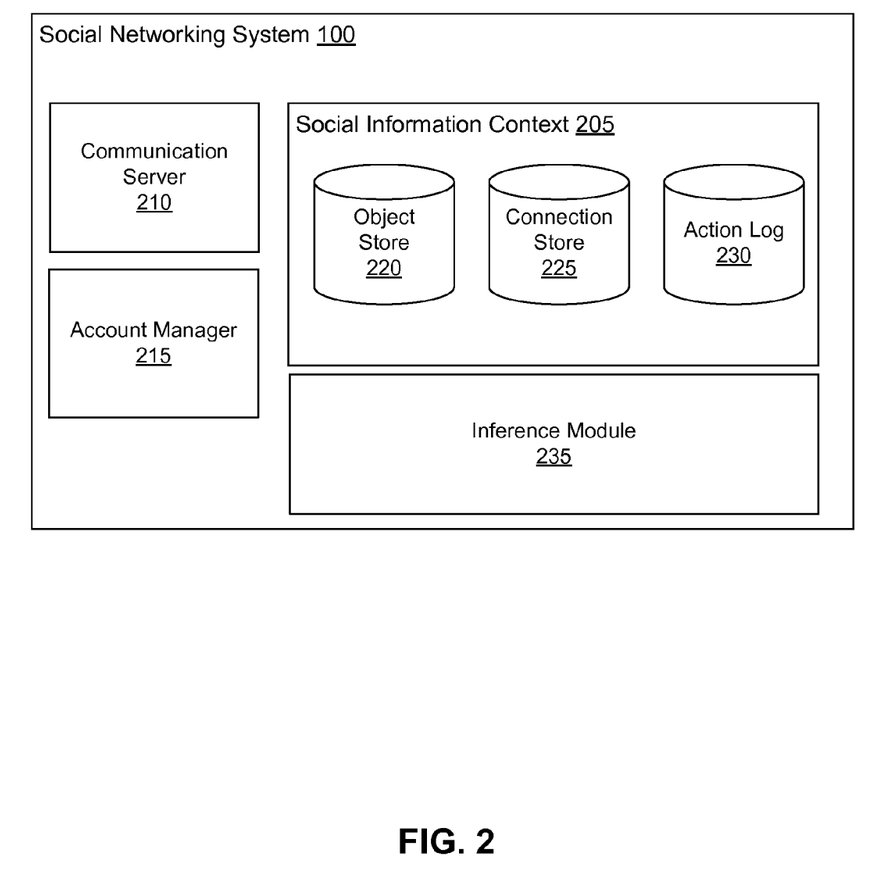
FIG. 2 is a high level block diagram of the components of a social networking system in accordance with an embodiment of the invention.

The social networking system 100 stores information related to users and other entities and provides this information to the users 104 through their client devices 105. FIG. 2 illustrates a more detailed view of the components of one embodiment of the social networking system 100. In the embodiment shown by FIG. 2, the social networking system 100 includes a communication server 210, an account manager 215, a social context store 205 and an inference module 235. Different implementations of the social networking system 100 may use different modules in different combinations and may include other modules.

The communication server 210 links the social networking system 100 via the network 110 to one or more of the client devices 205. Additionally, the communication server 210 provides information from the social networking system 100 to the client devices 105 for presentation to the users 104. The communication server 210 also receives information from the client devices 105 and provides it to components of the social networking system 100.

The account manager 215 authenticates users 104 communicating with the social networking system 100 using the client devices 105. For example, a user 104 provides a user name and password through a client device 105 to the communication server 210. The user name and password are communicated to the account manager 215, which verifies that the user name and password correspond to an account maintained by the social networking system 100.

In one embodiment, the communication server 210 acts as a web server and serves web pages, as well as other web-related content, such as JAVA®, FLASH®, XML, and so forth to the client devices 105 via the network 110. The communication server 210 may also act as an application server and serves application specific data to the client devices 105, such as application-specific JAVASCRIPT® Object Notation (JSON), etc. In some embodiments, the communication server 210 receives standard communication such as e-mails, short message service (SMS) messages, text messages, voice calls, etc., and routes these communications between users of the social networking system 100. The routed communication may be processed and stored by the social networking system 100 in the social context store 250 to provide additional information about social networking system users. The social networking system 100 may include other components to assist in communications such as network interfaces, security mechanisms, load balancers, failover servers, management and network operations consoles, and the like. These are not shown explicitly in FIG. 2.

The social context store 205 stores data related to entities—including users—in the social networking system 100 and the connections between these entities. The social context store 205 includes an object store 220, connection store 225, and an action log 230. However, the social context store 205 may also include other information collected from external feeds, third-party databases, etc. Data from the social context store 205 is used by the inference module 235, further described below, to generate suggested connections to additional users.

The users and other entities whose information is stored by the social networking system may be represented in the social networking system 100 as objects, which are stored in the object store 220. There may be distinct object types for the different types of entities whose information is stored by the social networking system 100 (e.g. user objects, restaurant objects, event objects, etc.). Information received by the communication server 210 may be associated with specific user objects in the object store 220 based on the account verification performed by the account manager 215.

The social networking system 100 tracks connections between the stored objects, and stores the connections between objects as connection objects in the connection store 225. The connection objects represent relationships between objects in the object store 220. For example, if a user indicates that they are a fan of a particular musician, a connection object is created linking that user's object and the musician's object. The connection object in this example may have a connection type indicating that the user is "a fan of" the musician. The connection store 225 may store a number of different connection types to track a variety of relationships between objects in the object store 220.

In one embodiment, the connection store 225 includes connection objects that indicate a family relationship between users. For example, users 104 Mary and Josephine are sisters, and represented as two user objects in the object store 220; a connection object in the connection store 225 links the user objects representing Mary and Josephine and indicates a "sister of" relationship between the user objects. If the social networking system 100 is asked to provide a list of Mary's family members, connection objects associated with Mary's user object and having a type indicating familial relationships are retrieved and used to identify the user objects that are connected to her through familial relationships. One of these familial connection objects will indicate that Mary is the sister of Josephine by linking the user objects for these two users with a "sister of" connection type.

The social networking system 100 may also store information related to the actions of users and other entities. For example, when the social networking system 100 receives information that a user has taken a particular action, an action object is generated for that action. The action object indicates the type of action taken by the user and the objects related to that action. For example, if a user dines at a particular restaurant, an action object may be generated identifying the user, the restaurant, the time of dining, the other dinner companions etc. The action objects may be logged in the action log 230. The action log 230 may also track the actions taken by users on the social networking system 100, for example sending messages to other users, posting photos, posting comments, etc.

The inference module 235 generates data inferences about users and other entities based on data in the social context store 205. The data inferences are guesses about information about the users and other entities that is not included in the social context store 205. For example, if a user 104 has not provided their family information to the social networking system 100, the inference module 235 may generate a set of data inferences for other users that have a familial connection to the user 104 based on information stored in the social context store 205. An object for which data inferences are generated is referred to herein as an "inference target object." Similarly, a user for which data inferences are generated is referred to as an "inference target user." It is assumed that the inference target is associated with a corresponding inference target object in the social context store 205.

The data inferences generated for a user 104 may be sent to a client device 105 associated with that user 104, where the user 104 may be given an opportunity to confirm or reject the inferences. If the inferences are confirmed, that confirmation is sent back to the inference module 235 via the communication server 210. Responsive to receiving a confirmation of an inference, the data identified by the confirmed inference is stored in the social context store 205. For example, data is added to a user object in the object store 220 associated with the inference target user, or a new connection object, based on the confirmed inference, is stored in the connection store 225. If an inference target user confirms a family connection inference, a connection object for the confirmed family connection is generated and stored in the connection store 225. The object to which the inference target user, or inference target object, is connected is referred to as an "inference subject object," or "inference subject user." Hence, a connection for an inference target object generated from a confirmed data inference connects the inference target object to an inference subject object.

A data inference generated by the inference module 235 allows insertion of additional data into existing objects or generation of new objects in the social context store 205. In some implementations, a data inference may directly insert data into an object or generate objects without the inference module 235 receiving confirmation of the data inference from an associated user. For example, generated data inferences may be associated with an object or used to generate an object when confidence in the data inference is high, where the adverse consequences for storing erroneous data are low, or when users are likely to correct or delete erroneous data themselves.

In an embodiment, data inferences are generated based on social information (i.e. object data, connection data, and action data) in the social context store 205 associated with a set of users in addition to the inference target user. Using information associated with a set of users may provide a more accurate inference for desired information than using information associated with a single inference target user. The set of users selected for generating a data inference are called an "inference input set." When a data inference is generated for an inference target user, an inference input set of users can be selected based on the users connected to the inference target user. The inference input set of users for an inference target user may often be a subset of the users connected to the inference target user relevant to a type of data inference being generated. For example, to generate a data inference identifying a familial connection to an inference target user, the inference input set may be selected so that only the users connected to the inference target user by a familial relationship connection are included in the set.

In various embodiments, the inference input set for an inference target object may be selected based on criteria such as connection type linking the user to the inference target user, age of the user, location, income, school, place of work, whether the user has attended an event, etc. In one implementation, the inference input set is selected based on a metric that measures the closeness of a user and the inference target user. This metric may be an "affinity" score between the objects representing a user and the inference target user. Systems and methods for generating an affinity score between objects in the social networking system 100 are described in U.S. application Ser. No. 12/978,265, filed on Dec. 23, 2010, which is hereby incorporated by reference in its entirety.

In various embodiments, the data inferences that are generated for an inference target user may also be used to target advertising for that user. In one implementation, the system identifies one or more inference subject users that share an inferred or confirmed familial connection with an inference target user. The system then targets advertisements for the target user based on the social information associated with the inference subject users. The system may target advertising based on the social information of all the inference subject users, or it may target advertising based only on the social information of the inference subject users that are confirmed familial connections of the inference target user. For example, the system may infer that a particular user (inference target) has a sibling connection to three other users (inference subjects) in the social networking system. Based on these inferred familial connections, the system may access the social information associated with the inference subjects. The social information of the inference subjects may include information about hobbies, interests, musical taste, sports teams, etc. Based on this information from the sibling users, the system may target advertisements for the inference target that contain messages about particular hobbies, interests, musical artists, sports teams, etc. The system may also target advertising for an inference target user based only on the existence of familial connections, without using the social information of the inference subject users. For example, if the social networking system determines that a target user has sibling connections to three or more other users, the system may determine that the user belongs to a large family, and based on this information may target advertising for the target user that is suitable for members of large families. For example, discount coupons for large family meals, group tickets for events, family t-shirt deals, etc. Systems and methods for targeting advertisements for a social networking system user based on inferred data for that user are described in U.S. application Ser. No. 12/916,322, filed on Oct. 29, 2010, which is hereby incorporated by reference in its entirety.

Figure 3:
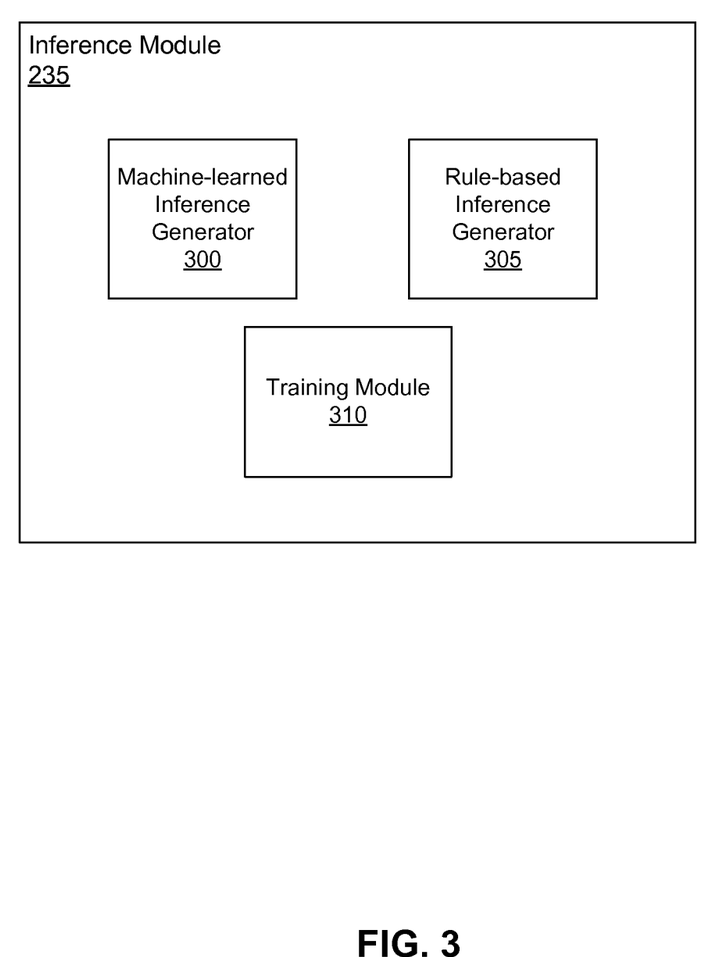
FIG. 3 is a high level block diagram of the components of an inference module included in a social networking system in accordance with an embodiment of the invention.

FIG. 3 illustrates one embodiment of an inference module 235. In some implementations the inference module 235 may have additional components than those shown in FIG. 3, or the illustrated components may be combined to provide similar functionality. The inference module 235 in the example of FIG. 3 includes a machine-learned inference generator 300, a rule-based inference generator 305, and a training module 310.

The machine-learned inference generator 300 generates data inferences based on information associated with a provided inference target object in the object store 220. The data inferences are generated from existing information in the inference target object as well as other information in the social context store 205 (e.g., connection information from the connection store 225, action information from the action log 230, etc.). The machine-learned inference generator 300 use machine-learned algorithms trained using the training module 310 to produce data inferences. In one embodiment, the inference module 235 includes multiple machine-learned inference generators 300 that are each configured to infer a particular set of information about objects in the social networking system 100. For example, different machine-learned inference generators 300 may be used to infer gender, geographic location, income, and other information associated with user objects in the object store 220. In some implementations, a machine-learned inference generators 300 may generate data inferences based on information associated with an inference target object as well as information associated with an the inference input set of objects connected to the inference target object.

The training module 310 trains one or more machine-learned inference generators 300 using a training set specified for each machine-learned inference generator's data inference task. One or more machine-learned models used by a machine-learned inference generator 300 are trained by one or more training sets and are then used to predict a type of data inference for a target object using information from the social information context 205 for the target object. For example, to train a machine-learned inference generator 300 to infer user gender, a training set includes a set of user objects where the gender is known as well as a set of associated connection information and action information for those user objects. The training module 310 uses this training set to train one or more machine-learned models used by a machine-learned inference generator 300 to determine correlations between gender and the information included in the user objects, connection objects, and/or action objects specified by the training set. The machine-learned inference generator 300 for gender then applies these trained machine-learned models to an inference target user object where the gender is unknown to make a gender inference for the inference target user object based on data in the inference target user object as well as its associated connection and action objects.

Like the machine-learned inference generator 300, a rule-based inference generator 305 produces data inferences for inference target objects in the object store 220 based on the data associated with the inference target objects in the social context store 205. While the machine-learned inference generator 300 produces data inferences based on trained machine-learned models, the rule-based inference generator 305 produces data inferences using rules specified by administrators. These rules, referred to as "inference rules," are based on patterns known to, or identified by, administrators. The rule-based inference generator 305 may generate inferences more efficiently than the machine-learned inference generator 300 when inference patterns can be found and defined by administrators.

Some inference patterns suitable for forming inference rules may be readily identified by observation of the social context store 205 or may be discovered through statistical analysis of the social context store 205. An example of a readily observed inference pattern is the case where user A is a sibling of user B, and user B is a sibling of user C; in this example there is a high probability that user A is also a sibling of user C. From this pattern, an administrator may create an inference rule for application by the rule-based inference generator 305 for inferring a data inference of a sibling connection between two users, user A and user C, if a connection object indicates that user object A is a "sibling of" user object B and a connection object indicates that user object B is a "sibling of" user object C. In one embodiment, the data inference generated by the rule-based inference generator 305 is presented to users 104 associated with user object A and/or C (i.e., the actual persons A and C). If the data inference is confirmed by one or more of the users 104, a new connection object is stored in the connection store 225 indicating that A is connected to C with a "sibling of" relationship type. The inference module 235 may maintain different rule-based inference generators 305 for different data inference tasks. Each rule-based inference generator 305 may be based on a different inference rule, which may be based on an inference pattern observed from the social information context 205.

The above example illustrated an inference rule mapping existing connection objects of one type to an inferred connection object of the same type as the existing connection objects. In the example, "sibling of" connection objects between A and B and between and B and C, map to—or generate an inference for—a "sibling of" connection object between A and C. In other embodiments, different rule-based inference generators 305 may apply inference rules mapping connection object types to different connection object types. For example, inference rules may create mappings between "sibling of" connection object types, "child of" connection object types, "spouse of" object types, "cousin of" connection object types etc. These various inference rules allow coverage of a variety of different inference patterns. A few examples include: if A is the sibling of B and B is the offspring of C then A is the offspring of C; if A is the cousin of B and B is the cousin of C, then A is the cousin of B; if A is the uncle/aunt of B, and B is the sibling of C, then A is the uncle/aunt of B, etc.

Besides mapping connection objects to other connection objects, the rule-based inference generator 305 may also map object data and action objects from the social information context 205 to connection object types. For example, it may be observed that users that attend the same family reunions are likely related. Based on this observation, an inference rule may be generated where if user object A is associated with an action object that indicates attendance of an event X, which has a type of "family reunion," and another user object B is associated with a similar action object indicating attendance of the same event X, a data inference may be generated that A is a "relative of" B. Similarly, it may be observed that when a person marries another person, the first person's siblings become the siblings-in-law of the other, and vice versa. Based on this observation, an inference rule may be generated where if a user object A is associated with an action object that indicates that the user A has "married" a user B, and if the user object B is associated with connection objects indicating a sibling relationship with user object C, then a data inference may be generated that A is a "sibling-in-law" of C.

Generating Data Inferences Related to Connections Between Users

Figure 4:
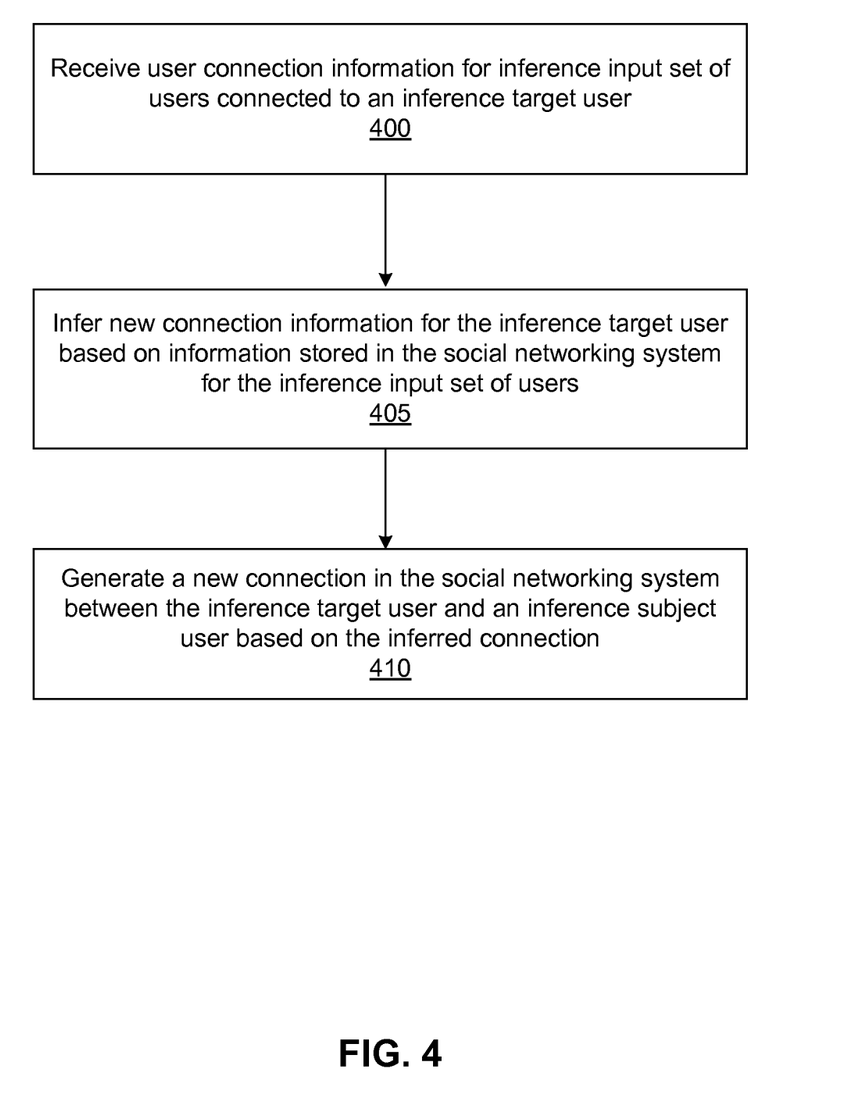
FIG. 4 is a flowchart of a process for inferring family connections in the social networking system in accordance with an embodiment of the invention.

FIG. 4 illustrates one implementation of a method for inferring connections to a social networking system user by generating data inferences based on the data associated with other users connected to the social networking system user in the social networking system 100. In some embodiments, the inferred connections are familial connections.

The inference module 235 receives 400 an identification of an inference target user for whom connection information is to be inferred and user connection information for an inference input set of users connected to the inference target user.

The inference input set may be selected based on the nature of the connection inference that is being made, such as a connection type of the connection to be inferred. For example, the inference module 235 infers a connection type for the inference target user associated with a familial relationship, so the inference input set is selected to include users connected to the inference target user by familial relationships. Other information may be used to select the inference input set, such as: user affinity, geographic location, or type of connection between other users and the inference target user. Combinations of criteria may also be used to select users included in the inference input set.

One or more rule-based inference generators 305 and/or machine-learned inference generators 300 analyzes connection information from users in the inference input set to infer 405 new connection information for the inference target user. Hence, inference module 235 uses the inference input set to infer connections between the inference target user and one or more inference subject users. In one embodiment, an inferred connection is sent to the inference target user and/or the inference subject user for confirmation.

If the inference target user and/or the inference subject user confirm an inferred connection, a new connection in the social networking system 100 between the inference target user and the inference subject user identified by the inference module 235 is generated 410. In some embodiments, the connection may be generated 410 without explicit user confirmation. For example, if the inference module 235 determines a confidence level associated with an inferred connection exceeds a specified threshold and the inferred connection has a specified connection type, a connection is generated 410 using the inferred connection.

Figure 5:
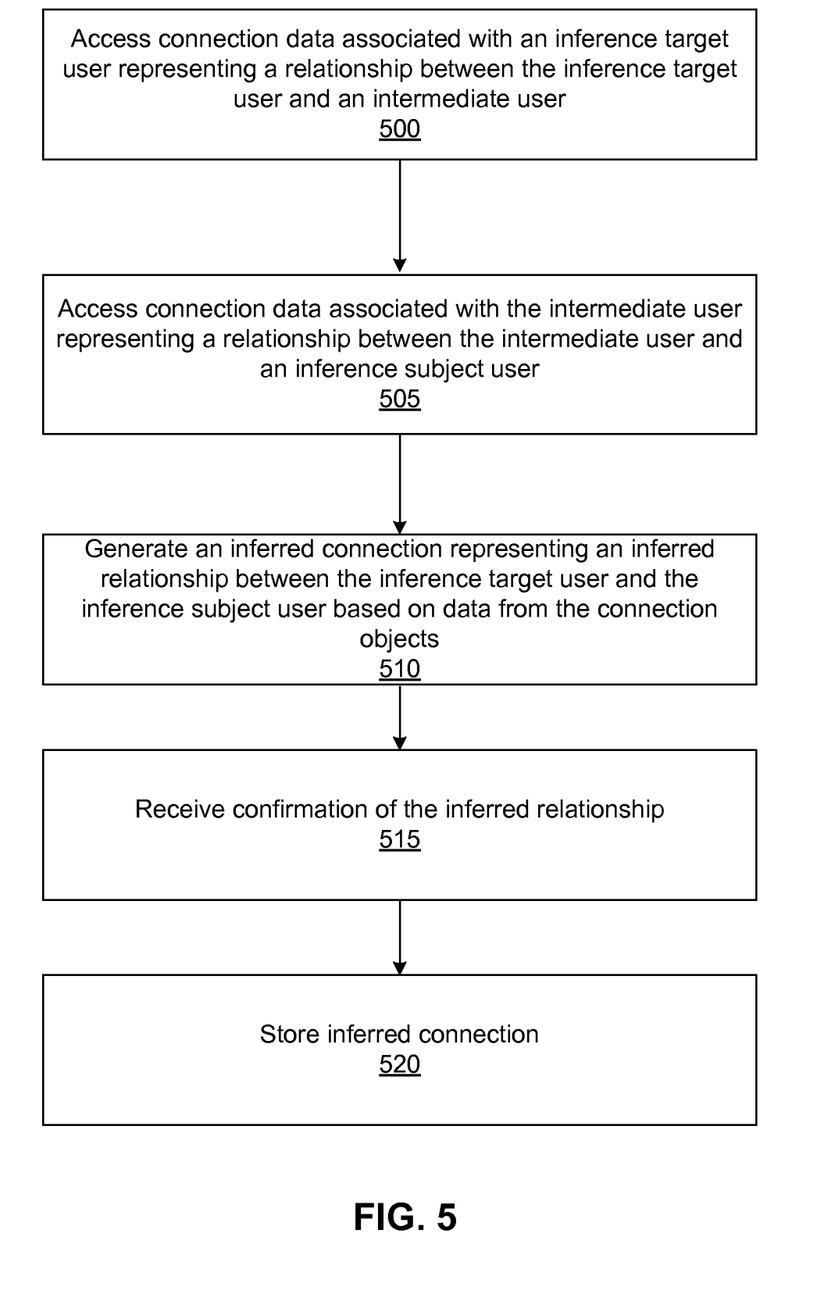
FIG. 5 is a flowchart of an alternative process for inferring family connections in the social networking system in accordance with an embodiment of the invention.

FIG. 5 illustrates an alternative method for inferring connections to a user based on social networking system information. An inference target user of the social networking system 100 is identified to the inference module 235, which accesses 500 data from the connection store 225 associated with the inference target user. This may involve accessing the user object in the object store 220 associated with the inference target user to identify one or more connection objects associated with the user object associated with the inference target user. Connection data included in an accessed connection object describes a relationship between the inference target user and an intermediate user.

Connection data associated with the intermediate user is accessed 505. Connection data associated with the intermediate user describes a relationship between the intermediate user and an inference subject user. Hence, the inference module 235 uses connection data associated with the inference target user to identify one or more intermediate users and uses connection data associated with intermediate users to identify one or more inference subject users for potentially connecting to the inference target user.

The connection data describing the relationship between the inference target user and the intermediate user as well as the connection data describing the relationship between the intermediate user and the inference subject user are used by a rule based inference generator and or a machine-learned inference generator to generate 510 a connection between the inference target user and the inference subject user. This generated connection represents an inferred relationship between the inference target user and the inference subject user. A connection type may be associated with the generated connection.

The social networking system 100 may present the generated connection describing the inferred relationship to the inference target user and/or the inference subject user for confirmation. Responsive to receiving 515 confirmation of the generated connection, the generated connection is stored 520 in the connection store 225.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
accessing connection data for an inference target user of a social networking system, the connection data for the inference target user describing a relationship between the inference target user and an intermediate user of the social networking system;

accessing connection data for the intermediate user, the connection data for the intermediate user describing a relationship between the intermediate user and an inference subject user of the social networking system;

analyzing by a processor the connection data for the inference target user describing a relationship between the inference target user and an intermediate user of the social networking system and the connection data for the intermediate user describing a relationship between the intermediate user and an inference subject user of the social networking system;

inferring by the processor a new connection between the inference target user and the inference subject user based at least in part on the analyzed connection data for the inference target user and the intermediate user;

presenting the inferred new connection to the inference target user;

receiving a confirmation of the inferred new connection from the inference target user; and storing the inferred new connection between the inference target user and the inference subject user.

2. The computer-implemented method of claim 1, wherein generating the inferred connection between the inference target user and the inference subject user comprises applying an inference rule to the connection data associated with the inference target user and the connection data associated with intermediate user, the inference rule mapping a connection type associated with the connection data associated with the inference target user and a connection type associated with the connection data associated with the intermediate user to an inference connection type.

3. The computer-implemented method of claim 1, wherein generating the inferred connection between the inference target user and the inference subject user comprises:

accessing action data stored in the social networking system describing one or more actions taken by the inference target user recorded by the social networking system; and generating the inferred connection object at least in part based on the one or more actions taken by the inference target user in addition to the connection data associated with the inference target user and the connection data associated with the intermediate user.

4. The computer-implemented method of claim 3, wherein:

the action data describes a marriage of the inference target user to the intermediate user;

the connection data associated with the intermediate user describes a sibling relationship between the intermediate user and the inference subject user; and generating the inferred connection comprises generating a connection describing a sibling-in-law relationship between the inference target user and the inference subject user.

5. The computer-implemented method of claim 1, wherein:

the connection data associated with the inference target user describes a sibling relationship between the inference target user and the intermediate user;

the connection data associated with the intermediate user describes a sibling relationship between the intermediate user and the inference subject user; and generating the inferred connection comprises generating a connection describing a sibling relationship between the inference target user and inference subject user.

6. The computer-implemented method of claim 1, wherein:

the connection data associated with the inference target user describes parental relationship between the inference target user and the intermediate user;

the connection data associated with the intermediate user describes a sibling relationship between the intermediate user and the inference subject user; and generating the inferred connection comprises generating a connection describing a parental relationship between the inference target user and inference subject user.

7. The computer-implemented method of claim 1, further comprising:

accessing social information associated with the inference subject user; and targeting an advertisement for the inference target user based at least in part on the social information.

8. A computer-implemented method comprising:

retrieving connection data associated with an inference input set of users in the social networking system that are connected to an inference target user in the social networking system;

identifying by a processor one or more additional users connected to at least one user in the inference input set of users from the connection data associated with the inference input set of users but not connected to the inference target user;

analyzing, by the processor, connection data describing a relationship between the at least one user in the inference input set of users and the additional user and based at least in part on connection data describing a relationship between the inference target user and the identified at least one user in the inference input set of users;

inferring by the processor a new connection between the inference target user and an additional user connected in the social networking system to at least one user in the inference input set of users based at least in part on the analyzed connection data; and storing, in the social networking system, the inferred new connection between the inference target user and the additional user connected to the at least one user in the inference input set.

9. The computer-implemented method of claim 8, wherein the inferred new connection information indicates that the inference target user and the additional user connected to the at least one user in the inference input set are connected by a familial relationship.

10. The computer-implemented method of claim 8, wherein storing, in the social networking system, the inferred connection between the inference target user and the additional user connected to the at least one user in the inference set of input comprises:

sending a description of the inferred connection to the inference target user; and responsive to receiving confirmation of the inferred connection information from the inference target user, storing the inferred connection in the social networking system.

11. The computer-implemented method of claim 8, wherein the inference input set of users is a subset of users connected to the inference target user selected based on affinities of the inference target user for users connected to the inference target user.

12. The computer-implemented method of claim 8, wherein the inference input set of users is a subset of users connected to the inference target user by connections having a specified connection type.

13. The computer-implemented method of claim 12, wherein the specified connection type indicates a familial relationship.

14. The computer-implemented method of claim 8, wherein the inference input set of users is determined based on a connection type associated with the inferred connection.

15. The computer-implemented method of claim 8, further comprising:
   accessing social information associated with the one or more additional users connected to at least one user in the inference input set of users; and
   targeting an advertisement for the inference target user based at least in part on the social information.

* * * * *